Dec. 27, 1938. A. M. BROWN 2,141,900
SLIDABLE FASTENER
Filed Jan. 22, 1937 5 Sheets-Sheet 1
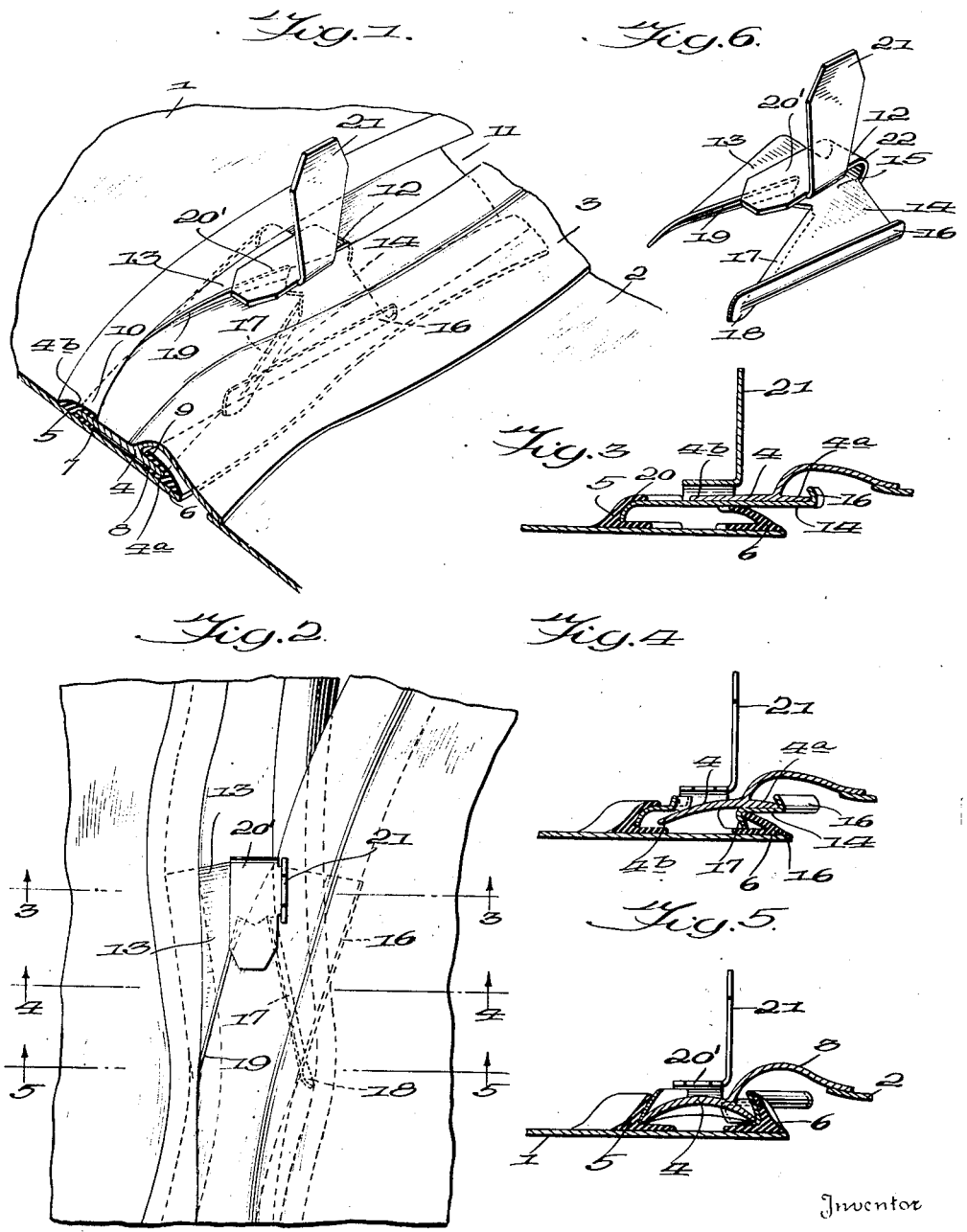
Inventor
Alexander M. Brown,
By Smith, Michael & Gardner,
Attorneys.

Dec. 27, 1938.  A. M. BROWN  2,141,900
SLIDABLE FASTENER
Filed Jan. 22, 1937  5 Sheets-Sheet 2
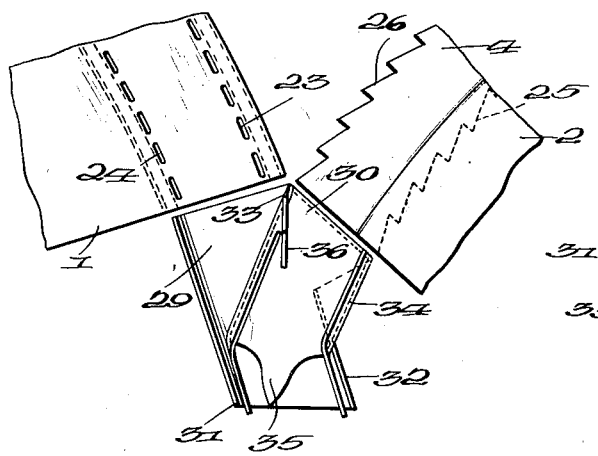
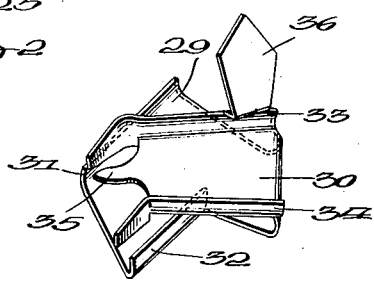
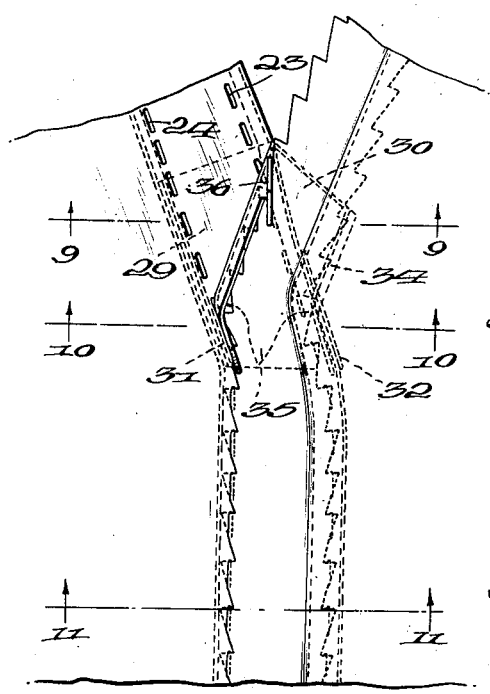
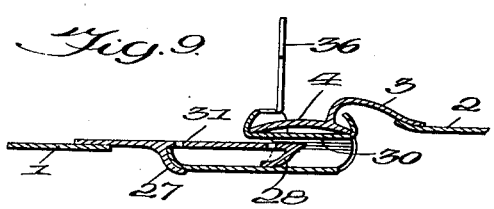
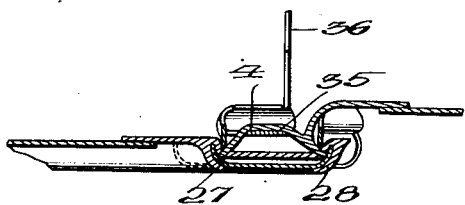
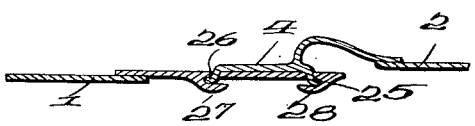
Inventor
Alexander M. Brown,
By Smith, Michael & Gardiner,
Attorneys.

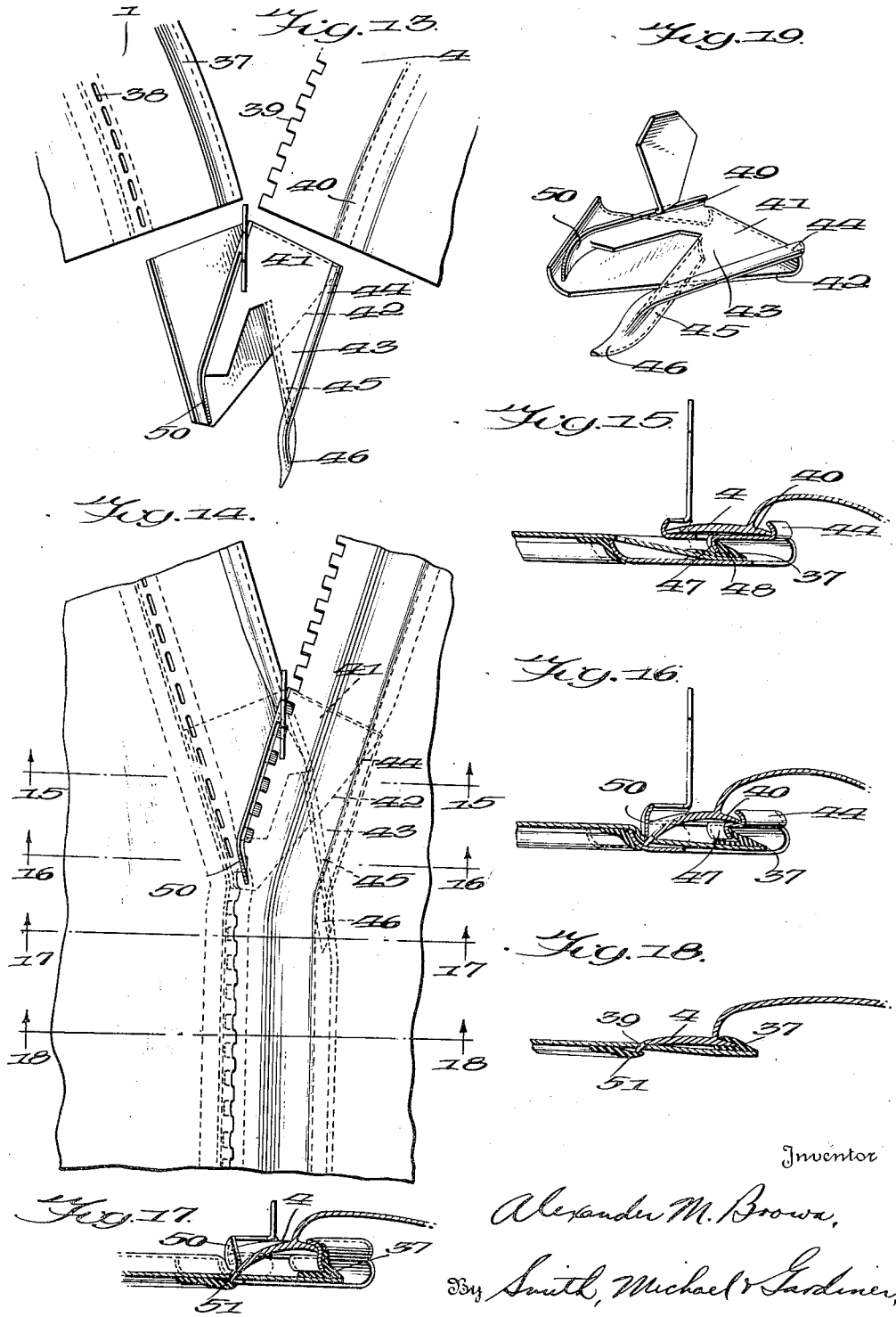

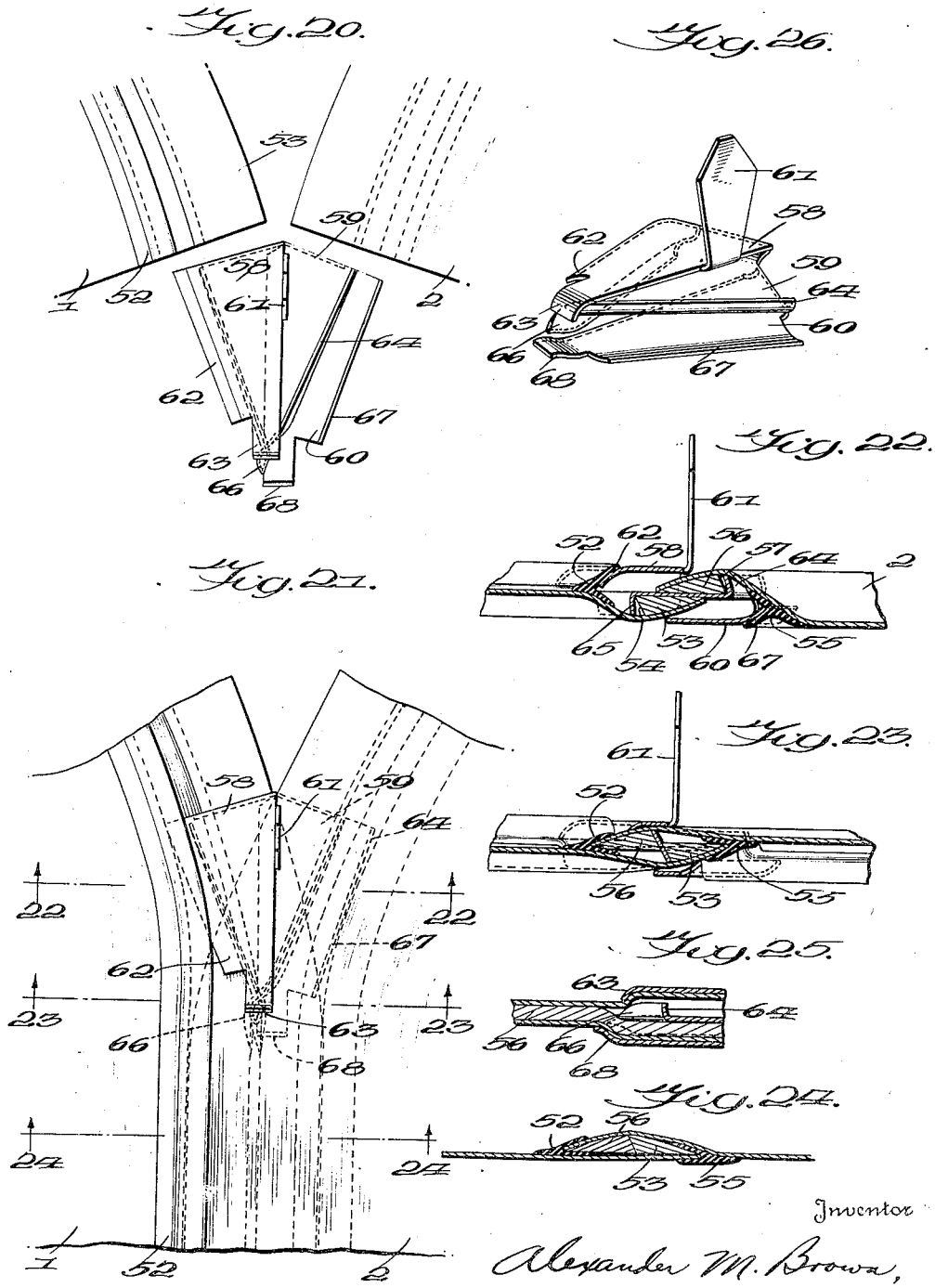

Dec. 27, 1938.  A. M. BROWN  2,141,900
SLIDABLE FASTENER
Filed Jan. 22, 1937  5 Sheets-Sheet 5
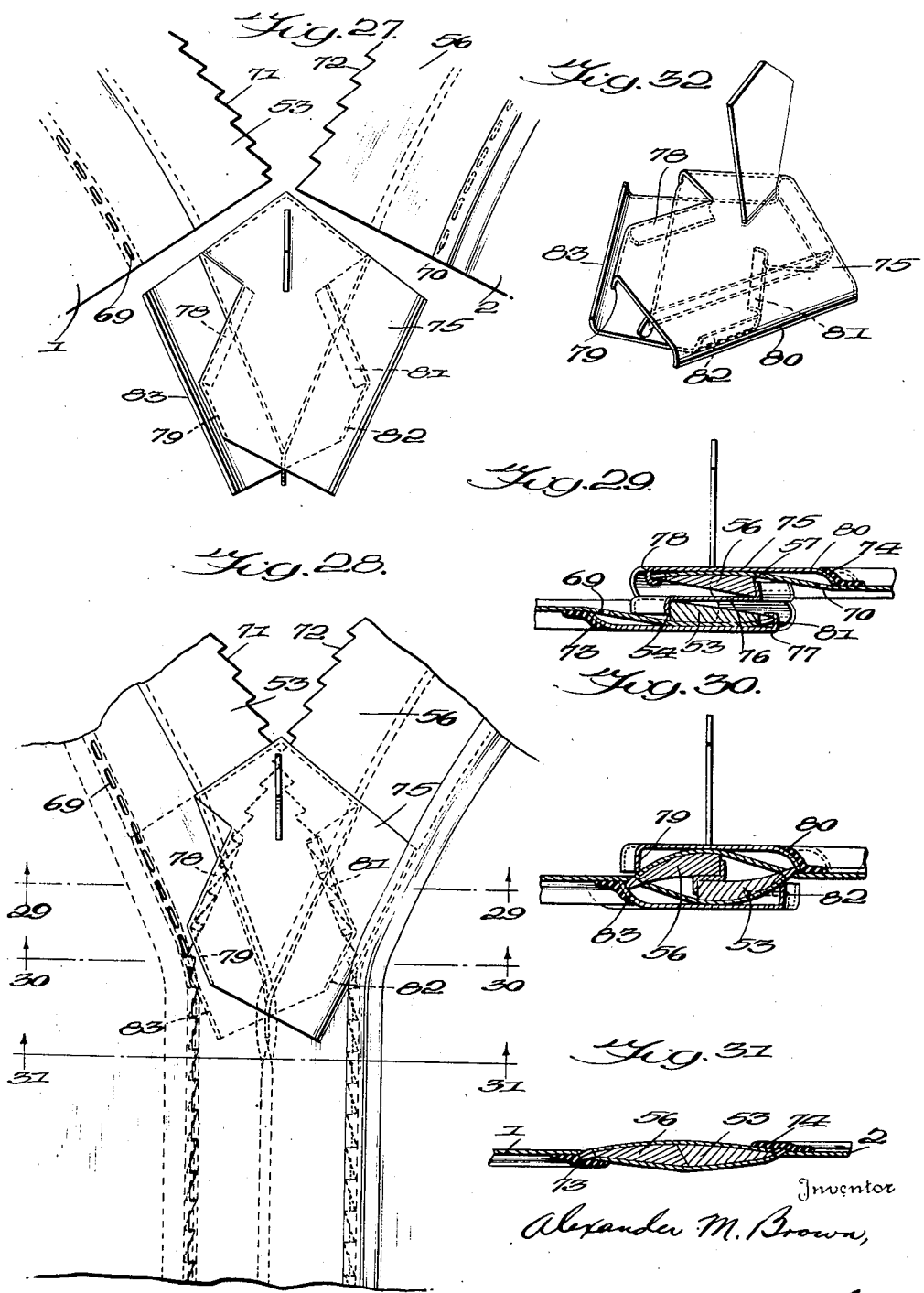
Inventor
Alexander M. Brown,
By Smith, Michael & Gardiner
Attorneys Patented Dec. 27, 1938

2,141,900

UNITED STATES PATENT OFFICE 2,141,900

SLIDABLE FASTENER

Alexander M. Brown, Ocean Grove, N. J.

Application January 22, 1937, Serial No. 121,885

15 Claims. (Cl. 24—205)

This invention relates to slidable fasteners and is directed more particularly to that type of fastener which is made of continuous strip members secured to adjacent edges of the material to be joined, the strip members being provided with interlocking elements which are engaged and disengaged by means of a slide cooperating with the strip members.

An object of the invention is to provide a fastener of this type that is relatively flat and which is quite unnoticeable.

In addition, this particular type of fastener provides for flexibility in the joint and eliminates metallic constructions which, when exposed to the elements, tend to rust or corrode, thereby becoming difficult to operate.

A further object of the invention is to provide a waterproof connection which is dependable in operation, extremely simple in construction and which can be manufactured economically.

Additionally, this fastener possesses the advantage of eliminating the box-like structures which are present in most fasteners of this type.

Additional objects and advantages will be readily apparent from the following description taken in connection with the accompanying drawings, in which I have illustrated the preferred forms of my invention.

In the drawings:

Figure 1 is a fragmentary perspective view of my invention showing the operation of closing or opening partially completed.

Fig. 2 is a plan view thereof.

Figs. 3, 4 and 5 are transverse sectional views taken on the lines 3—3, 4—4 and 5—5, respectively, of Fig. 2.

Fig. 6 is a perspective view of the slide employed to effect opening and closing of the fastener shown in Figs. 1 to 5.

Fig. 7 is a plan view of a modified form of the construction shown in Figs. 1 to 5 with the parts separated for purposes of clarity.

Fig. 8 is a plan view showing the elements associated and with the members to be joined partially engaged.

Figs. 9, 10 and 11 are transverse sectional views taken on the lines 9—9, 10—10 and 11—11, respectively, of Fig. 8.

Fig. 12 is a perspective view of the slide employed with the invention disclosed in Figs. 7 to 11 inclusive.

Fig. 13 is a view similar to Fig. 7 of a further modification.

Fig. 14 is a view similar to Fig. 8 of this form of the invention.

Figs. 15, 16, 17 and 18 are transverse sectional views on the lines 15—15, 16—16, 17—17 and 18—18, respectively, of Fig. 14.

Fig. 19 is a perspective view of the slide used in connection with the type of fastener disclosed in Figs. 13 to 18 inclusive.

Fig. 20 is a view similar to Fig. 7 of a still further modification.

Fig. 21 is a plan view of the construction shown in Fig. 20 with the parts in associated relationship.

Figs. 22, 23 and 24 are transverse sectional views on the lines 22—22, 23—23 and 24—24, respectively, of Fig. 21.

Fig. 25 is a fragmentary, longitudinal, sectional view taken through the slide and associated members when in engaged position.

Fig. 26 is a perspective view of the slide used in connection with that form of the invention disclosed in Figs. 20 to 25 inclusive.

Fig. 27 is a view similar to Fig. 7 disclosing a still further variation.

Fig. 28 is a plan view of the construction shown in Fig. 27 with the parts in assembled relation.

Figs. 29, 30 and 31 are transverse sectional views taken on the lines 29—29, 30—30 and 31—31, respectively, of Fig. 28, and Fig. 32 is a perspective view of the slide employed in connection with the fastener disclosed in Figs. 27 to 31 inclusive.

In the drawings, Figs. 1 to 6 illustrate the simplest form of my invention and disclose sheets of material 1 and 2 which are to be joined together by means of the fastener forming the subject-matter of this invention. This material may be of any suitable character such as fabric, rubber, metal or the like.

Secured to the edge of the sheet 2 by any suitable means, depending upon the material with which the fastener is associated, is a continuous strip 3 projecting from the edge of the sheet 2 and having integrally formed therewith a head 4 consisting of a relatively flat, narrow strip, the edges 4ª and 4ᵇ of which are to be engaged by the cooperating fastening elements.

While I have described the strip 3 and the head 4 as being of integral construction, it is of course understood that these parts may be made separately and suitably secured together in any desired manner. Also that strip 3 may be integral with the sheet 2.

The strip 3 and its attached head 4 are made of any suitable material so long as it is either compressible or flexible, but it is essential that it have inherent resiliency because this characteristic is depended upon to cause the final interlocking operation of the fastener. For instance, the strip 3 and its head 4 may be made of rubber so that the same can be readily flexed and/or compressed, or the head 4 may be made of a thin strip of resilient metal suitably secured to the flexible strip 3.

On the edge of the sheet 1 there are provided spaced channels as shown at 5 and 6 with the openings 7 and 8 therein facing each other and providing overhanging lips 9 and 10 which overlie the edges 4ª and 4ᵇ, respectively, of the head 4 when the fastener is in closed position. These channels are made of any suitable material such as rubber which may be vulcanized to the sheet 1 or they may be secured by stitching or any other means.

The openings in the channel members 5 and 6 are substantially V-shaped so that the overhanging lips 9 and 10 extend well over the edges of the strip 4. This is essential to the successful operation of my invention because it will be seen that if the overhanging lips engaged merely the extremities of the head, flexing of the joint would be likely to cause disengagement between the channels and the head 4.

It will further be seen from an inspection of Fig. 1 that the head 4 is of a width greater than the slot 11 between the channel members 5 and 6 and it is obvious, therefore, that in order to insert the head 4 into the channels, this head must be compressed or flexed so as to reduce its width so that it can enter the slot 11. In actual operation it will be seen that first the edge 4ᵇ is inserted and then the edge 4ª. The head 4 is then permitted to expand due to its resiliency so that the edges thereof project into the openings 7 and 8 in the channels 5 and 6.

To accomplish this operation a slide 12 is provided such as shown in Fig. 6. This slide consists of a pair of triangular plates 13 and 14 joined as at 15 at the wider end thereof.

The plate 14 is provided with a marginal upstanding flange 16 on its outer edge extending throughout the length of the plate and with a depending flange 17 on its inner edge extending from the apex toward the wider end of the plate but terminating short of the rear edge thereof.

The flanges 16 and 17 merge at the apex of the triangle as at 18 forming a substantially vertical fin.

The plate 13 is provided at its inner edge with an upstanding flange 19 corresponding in length to the flange 17 and on its outer marginal edge with a depending flange 20 corresponding in length to the flange 16 on the plate 14.

Attached to the wider end of the slide is a relatively narrow plate 20' extending horizontally over and parallel to the connecting portion 15 between the plates 13 and 14, and secured to the horizontal plate 20' is a suitable handle 21 which may be either rigidly secured or pivotally connected thereto, as may be desired.

The horizontally extending plate 20' is connected to the rear end of the slide by a connecting portion 22 and it is to be observed from an inspection of Figs. 1 and 2 that the distance between the edge of the connecting portion 22 and the flange 16 on the plate 14 coincides with the width of the head 4, these two surfaces acting to guide the head 4 into position over the channels 5 and 6 as the slide is moved in a direction to close the fastener.

Referring to Fig. 3, the head 4 is shown in its flattened position and resting on the connecting portion 15 with the flange 16 of plate 14 engaging one edge 4ª thereof. The flange 20 on the plate 13 is positioned within the channel 5. The flange 17 on the plate 14 is in the channel 6, as seen in Fig. 4, so that the sheet 1 is held in proper position.

As the slide is moved upwardly to completely interlock the fastening members it will be seen that the flange 19 gradually flattens out and since this flange is in engagement with the edge 4ᵇ of the head 4, the edge of the head 4 is flexed downwardly as shown in Fig. 4 and into the channel 5.

The opposite edge of the head is still in engagement with the flange 16 and the flange 17 is still in engagement with the channel 6. However, as the slide continues its movement toward closing position due to the merging of the flanges 16 and 17 into the vertical fin 18, it will be apparent that the edge 4ª of the head will be additionally flexed until it passes through the slot 11 and into engagement with the channel 6, as seen in Fig. 5.

Continued movement of the slide releases the edges of the head 4 from engagement with the flanges on the slide, and due to the resiliency or compressibility of the head it immediately expands into firm engagement with the channels.

It will be understood, of course, that movement in the opposite direction effects release of the fastener in a manner reversed from that described above and while the description so far has been predicated upon the thought that the slide is moved upwardly to close the fastener, it is, of course, obvious that it may be arranged to move in an opposite direction while accomplishing the same result.

It is to be further understood that substantially the same operation as described above may be effected by relying upon the compressibility of the material from which the channels 5 and 6 are made, if they are made of rubber, and the operation of the slide will cause the head 4, which in this case will be rigid, to compress the material of the channels 5 and 6, thereby permitting passage of the head 4 therethrough, after which the expansion of the material from which the channels 5 and 6 are formed will cause firm engagement between said channels and the head 4.

Referring now to the modified form shown in Figs. 7 to 12 inclusive, it will be seen that the same principle is involved as in the figures previously described with the exception that in this case the channels 5 and 6 are eliminated and instead the sheet 1 is provided with spaced rows of openings 23 and 24 as shown in Fig. 7, and each edge of the head 4 is provided with a series of teeth 25 and 26 which engage in the openings 23 and 24, respectively, when the fastener is closed.

It is to be noted in this connection that the distance between the spaced rows of holes 23 and 24 is less than the width of the head 4 so that in order to engage the teeth 25 and 26 in said openings the head 4 must be flexed or compressed and then permitted to expand after the teeth have been inserted in the openings.

When the head 4 has assumed its distended position it will be seen from an inspection of Fig. 11 that the teeth project through the sheet 1 and in order to prevent accidental displacement of these teeth from the openings and to provide means for supporting the sheet 1 from the plate 29 of the slide, there are provided continuously extending channels 27 and 28 on the lower face thereof and which overlie the protruding teeth.

In this form of the invention the strip carrying the rows of spaced holes has been illustrated in Figs. 9 to 11 as being formed of a separate piece of material attached to the member 1, but of course it is understood that this may be integral, as shown in Fig. 7, and that the depending channels 27 and 28 may be secured thereto in any suitable manner just as the channels 5 and 6 of the form shown in Fig. 1 are attached thereto.

In order to bring about the interlocking engagement between the sheets 1 and 2 of the form shown in Figs. 7 to 11 inclusive, a slightly modified form of slide is necessary. This slide is shown in Fig. 12 and consists of plates 29 and 30 overlying each other in parallel relation.

The plate 29, which is the lower plate, is provided with upwardly extending flanges 31 and 32 at the marginal edges thereof which form guides for the edge of the sheet 1 by engagement with channels 27 and 28, respectively, and the upper plate 30 is likewise provided with upstanding flanges 33 and 34 which form a guideway for the head 4. It will be noted from an inspection of Figs. 7 and 12 that at the wider end of the slide the guideways formed by the flanges on the respective plates extend at an angle to each other. This is for the purpose of bringing the edges of the fastening elements carried by sheets 1 and 2 toward each other so that they ultimately overlap, after which the flanges 33 and 34 on the upper plate are bent to extend in the same direction as the flanges 31 and 32 on the lower plate. The operation of this form of my invention is accomplished as follows:

The flange 31 engages in the channel 27 and the flange 32 engages the channel 28 so that the sheet 1 is held in position to receive the teeth 25 and 26 in their respective openings 23 and 24.

The head 4 is carried by the plate 30 between the flanges 33 and 34 in flexed position. Therefore, as the slide is moved to bring the interlocking members into engagement, it will be seen that the sheets 1 and 2 are moved toward each other due to the angularity of the guiding flanges and then moved so that the teeth 25 and 26 lie above the openings 23 and 24 due to the change in direction of the flanges 33 and 34 as described.

It will be noted that the upper plate 30 terminates short of the ends of the flanges 33 and 34 so that upon movement of the slide the head 4 will be confined only between the flanges 33 and 34, and due to the inclination of these flanges at the smaller end of the guide it will be seen that any tendency of the head 4 to expand results in sliding the edges of the head 4 off of the flanges 33 and 34 in a downward direction so that the teeth are brought into engagement with the openings 23 and 24.

The plate 30 is provided with a central tongue 35 which supports the intermediate portion of the head 4 as shown in Fig. 10.

Further movement of the slide releases the head 4 from the tongue 35 and due to the resiliency of the head, the same tends to expand into its originally flat condition to project the teeth 25 and 26 fully into the holes 23 and 24 so that in this manner the sheets 1 and 2 are securely fastened together.

As in the case of the slide in Fig. 6, any suitable operating mechanism is provided as at 36. This may assume the form of a rigid member as disclosed or the conventional pivoted operating member which is well known in the prior art.

Figs. 13 to 18 are directed to a further modification which is similar to those previously described.

This construction is a combination of the structures described in the previous figures. It will be obvious from an inspection of this type of fastener that the difference resides in the fact that the sheet 1 carries at its marginal edge a channel 37 corresponding to the channel 6 in Fig. 1, and spaced inwardly from the channel 37 there is provided a row of openings 38 corresponding to the openings 24 of Fig. 7.

The head 4 is provided with teeth 39 on the marginal edge and an inner edge 40 corresponding to the edge 4ª received in the channel 6 in Fig. 1. The same broad principle of operation is present in this construction as in those previously described, but in this case also a somewhat different form of slide is necessary. This slide is shown in Fig. 19 and embodies some of the features of both of the slides previously described.

It will be seen from an inspection of Fig. 19 that upper and lower plates 41 and 42 are provided which extend parallel to each other in overlapping relation in the same manner as the plates of Fig. 12.

The upper plate 41 is provided with a triangular element 43 having along its outer edge an upturned inwardly extending flange 44 and a downwardly and outwardly directed flange 45 on its inner edge merging into the flange 44 at the narrow end of the slide and terminating in a twisted point 46 presenting on its inner surface an outwardly inclined face 47 to direct the edge 40 of the head 4 which engages the same downwardly and outwardly, and presenting at its inner face a hook 48 which engages in the channel 37.

The opposite edge of the plate 41 is provided with an upstanding, inwardly directed flange 49, the flanges 44 and 49 confining the head 4 therebetween in the same manner as the head 4 is confined in the construction shown in Fig. 12.

The plate 41 terminates short of the end of the flanges 49, as in Fig. 1, and upon movement of the slide the head 4 is brought into overlapping relation with the sheet 1 so that the teeth 39 register with the openings 38 just as the fastener disclosed in Figs. 7 to 12 and with the flange 45 on the upper plate engaged in the channel 37.

Continued movement of the slide toward closing position causes the edge of the head 4 to slide downwardly off the toe 50 of the flange 49 which at that point is not inclined inwardly but assumes substantially a vertical position, as shown in Fig. 16.

Due to the flexibility of the head 4 it will be seen that the teeth 39 project through the openings 38 in the sheet 1 while the opposite edge of the head 4 is still confined by the flange 44.

Further movement of the slide, however, causes this edge of the head 4 to slide off of the twisted toe 46 and due to the outwardly inclined face 47 engaging this edge, it will be seen that it will be projected upon expansion into the channel 37 whereupon the fastener assumes the position as shown in Fig. 18 with the teeth 39 firmly engaged within the openings 38 and protected by the continuous channel member 51 while the opposite edge of the head 4 is confined in the channel 37.

A somewhat different form of the present invention is disclosed in Figs. 20 to 25 inclusive.

In this case the same principle is likewise employed but it is to be noted that the cooperating elements of the fastener are duplicated on each edge of the sheets 1 and 2 but are in reversed position.

In this form of the invention the sheet 1 is provided with a continuous channel 52 spaced from the edge thereof and carries at its marginal edge a continuous strip of material 53 which is substantially triangular in cross-section with the apex of the triangle coinciding with the edge of the sheet 1 and having the base of the triangle formed with an inclined shoulder 54.

It will be noted that on sheet 1 the elements 52 and 53 are both carried by the upper face of the sheet 1. On sheet 2 the similar elements, that is, the continuous channel 55 and the triangular strip 56 carrying the inclined shoulder 57 are present, but on this sheet both elements are on the lower face.

The operation of this invention is broadly similar to those previously described with the exception that in this particular instance compressibility of the triangular strips 53 and 56 is relied upon solely to effect interlocking engagement.

These strips are made of rubber or similar resilient material in order that they may be compressed, forced into engagement and then permitted to expand to effect the locking operation.

From an examination of Fig. 21 it will be seen that the sheets 1 and 2 are fed into overlapping relationship by the slide, and an inspection of Figs. 22 to 24 inclusive indicates that the apex of the compressible strip 53 is fed into the channel 55 while the apex of the compressible strip 56 is fed into the channel 52. Further movement of the operating slide causes compression of the strips so that the bases of the triangular strips may move past each other and into substantially the same plane, after which the slide is moved out of engagement and the compressed strips 53 and 56 expand with the inclined shoulders thereof abutting each other and forming an interlocking joint which cannot be separated except by compression of the strips.

The firm engagement between these compressible strips 53 and 56 is caused by the fact that the shoulders 54 and 57 thereof are oppositely inclined and the compressible nature of these strips causes the same to wedge into tighter engagement as the strips expand, thereby causing the strips to assume the position shown in Fig. 24.

In order to operate this form of the invention an additional slide is provided as shown in Fig. 26. This slide consists of three superimposed parallelly extending plates 58, 59 and 60 joined at the wider end of the plate. The upper plate 58 is provided with a suitable operating handle 61 and is furthermore provided with a downwardly inclined flange 62 at its outer edge extending throughout substantially the entire length of the plate and has at its apex a downwardly directed toe 63.

The intermediate plate 59 is triangular in shape and is provided with an upwardly extending flange 64 along one edge and a downwardly extending flange 65 at the opposite edge with the flanges merging into a toe 66 forming in effect a vertical extending fin.

The lower plate 60 is provided with an upwardly inclined flange 67 somewhat longer than the flange 62 on the upper plate and has at its apex an upwardly directed toe 68 extending beyond the toe 63 and the fin 66.

The upper plate 58 overlaps the intermediate plate and the lower plate underlies the same with the inner marginal edges of these plates lying substantially along a line drawn between the apex and the base of the triangular plate 59. The flanges 62 and 67 on their respective plates converge toward each other so that the slide takes the general form of a triangle.

The operation of the slide is clearly illustrated in Figs. 22 to 24 in which the downwardly directed flange 62 on the plate 58 engages in the channel 52 and the upwardly directed flange 67 on the plate 60 engages within the channel 55.

The flange 64 engages behind the shoulder 57 of the compressible strip 56 and the flange 65 on the plate 59 engages behind the shoulder 54 of the compressible strip.

As the slide is moved to interlock the elements it will be seen that the compressible strips 56 and 53 will be slid over top of each other until their apices engage in their respective channels 52 and 55. Thereupon continued movement of slide causes the flanges 64 and 65 on the intermediate plate to compress the strips 53 and 56 so that the trailing ends of the compressible strips substantially overlie each other.

At this time the downwardly directed toe 63 on the plate 58 forces the compressible strip 56 downwardly and the upwardly inclined toe 68 on the plate 60 forces the lower compressible strip 53 upwardly into the position as shown in Fig. 23.

When the slide has been moved so as to disengage the flanges upon the compressible strips it will be apparent that expansion thereof will cause the inclined shoulders 54 and 57 to engage and interlock as shown in Fig. 24.

It will be noted in this figure that as the strips expand there is relative vertical movement between the same so that in its final position the strips 53 and 56 lie in the same plane and a relatively flat waterproof joint is formed.

In this form as in the others, the slide is described as moving with its broader end first to effect engagement and in reverse direction to effect disengagement of the fastener.

Referring now to Figs. 27 to 29, the construction disclosed therein is substantially the same as that disclosed in Figs. 20 to 25 but it has been modified by substituting teeth and openings to receive the teeth in the same manner as the construction in Figs. 7 to 9 differs from the construction shown in Figs. 1 to 5. In other words, in this form of the invention the sheets 1 and 2 instead of having the channels 52 and 55, are provided with rows of openings 69 and 70, respectively, and the compressible strips 53 and 56 are provided with teeth 71 and 72 at their marginal edges.

It will be seen from an inspection of Figs. 29 to 31 that the compressible strips 53 and 56 are of the same configuration and are provided with the inclined shoulders 54 and 57 just as in the form shown in Figs. 20 to 24. The strips are provided with channels 73 and 74 overlying the openings 69 and 70. These channels are for the same purpose as described in connection with Figs. 7 to 11, that is, to prevent accidental displacement of the teeth from the openings and at the same time cooperate with the slide to effect interlocking of the fastening element.

The form of slide used in connection with this modification is disclosed in Fig. 32 and consists of three superimposed parallelly extending plates 75, 76 and 77. The intermediate plate 76 is in all respects identical with the intermediate plate 59 of Fig. 26 and cooperates with the compressible strips 53 and 56 in the same manner so that further description thereof is believed to be unnecessary.

The uppermost plate 75 is provided at its inner edge throughout a portion of its length with an inwardly opening trough 78 and an adjoining downwardly directed flange 79.

On the opposite edge of the uppermost plate a downwardly directed flange 80 is provided which extends throughout the length of the plate at this edge.

The lower plate is substantially the reverse of the upper plate and is provided along a portion of one edge with an inwardly directed trough 81 and an adjoining upwardly directed flange 82, while on the opposite edge of the lower plate there is provided an upwardly directed flange 83.

The flanges 80 and 83 on their respective plates converge toward each other and the flanges 79 and 82 extend parallel therewith but spaced therefrom as seen in Fig. 32.

The operation of this form of the invention can be readily visualized by an inspection of Figs. 29 to 31 inclusive, from which it will be seen that the flange 80 of the upper plate 75 fits in the channel 74 and the inwardly directed trough 78 engages over the apex of the compressible strip 56.

Likewise, the inwardly directed trough 81 on the lower plate 77 engages over the apex of the compressible strip 53 while the upwardly directed flange 83 is seated in the channel 73.

Movement of the slide releases the apices of both compressible strip members 53 and 56 from the troughs 81 and 78, after which the edges of strip 56 are forced downwardly by the downwardly inclined flanges 79 and the edge of the strip 53 is forced upwardly by the flange 82 so that the teeth on the edge of these strips 53 and 56 pass into the openings 69 and 70.

Further movement of the slide causes the strips 53 and 56 to be compressed by the intermediate plate as described in connection with Figs. 20 to 24 until the inclined shoulders interlock, whereupon additional movement of the slide releases the same from engagement with the compressible strips, which then assume the position as shown in Fig. 1 with the teeth firmly projected into the openings and the inclined shoulders interlocking to produce a rigid and satisfactory fastener.

It is to be understood that in all forms of this invention the broad underlying principle is to provide a fastener in which continuous strip elements are employed and in which one or the other of the elements must be flexed or compressed in order to be brought into interlocking position, after which expansion due to the inherent resiliency of the device effects the interlocking engagement. To this end one of the sheets to be joined carries retaining means or sockets which receive a headed member and hold the same securely in place.

Another variant of the same broad concept can be accomplished by making head 4 and channels such as 5 and 6 in Fig. 1 of rigid material with the material of the sheet 1 which lies between the channels made elastic. The guide will then stretch this material to separate the channels so that the head may be introduced into the same after which the material will contract and cause the channels to firmly engage the opposite edges of the head 4.

I wish it understood that I do not desire to be limited to the precise details of construction as disclosed herein and that I intend the disclosure herein presented as being descriptive merely but not as limiting me to the precise forms shown.

It is to be realized that the series of teeth on the edges of the strip members need not be of any definite size or shape. They may be rounded instead of barbed or square, as shown, and one set of teeth may be longer than the other. Furthermore, it will be readily apparent to one skilled in the art that in that form of the invention disclosed in Figs. 13 to 18 inclusive, the construction could be modified by reversing the position of the series of openings and the channel member so that the teeth might be placed on the inner edge of the strip member 4 and the positions of the channel member 37 and the series of openings 38 on sheet 1 reversed so that the openings lie at the edge of the sheet member 1 and the channel in a position spaced from the edge.

From the foregoing it is believed to be obvious that a comparatively simple construction has been devised which may be cheaply manufactured and from which advantages accrue that are not present in known types of fasteners. For instance, the objectionable appearance of known fasteners is eliminated together with the elimination of cloth backing and facing strips which have heretofore been used to conceal the fasteners. Furthermore, my invention provides a fastener which provides for extreme flexibility at the joint without danger of disconnection, and at the same time provides a very flat fastener which is not unattractive in appearance. In addition, the fastener is of such type as to render the joint substantially waterproof and prevents ingress of air so that it is admirably suited for use in connection with articles which must withstand the action of the elements.

Having thus described my invention, what I claim as new and desire to secure by Letters Patent is:

1. A separable fastener for connecting the edges of adjacent sheets of material comprising retaining means carried by the edge of one of said sheets and extending throughout the length thereof, a flat distortable resilient head carried by the opposite sheet and extending throughout the length thereof, and a slide cooperating with the retaining means and head and having means thereon to bend the head and force it into engagement with the retaining means by which it is held against disengagement.

2. A separable fastener for connecting the edges of adjacent sheets of material comprising retaining means carried by the edge of one of said sheets and extending throughout the length thereof, a flat distortable resilient head carried by the opposite sheet and extending throughout the length thereof, and a slide cooperating with the retaining means and head, said slide including means for bending the head along a line extending longitudinally thereof and introducing the same into the retaining means, the resiliency of the head causing the same to expand into firm engagement with the retaining means.

3. A separable fastener for connecting the edges of adjacent sheets of material comprising retaining means on one of said sheets, said retaining means comprising an abutment adjacent the edge of said sheet and extending throughout the length of said edge, a second continuous abutment carried by said sheet in spaced relation to the first abutment to define an area between the same for accommodating an interengaging member, a distortable, resilient flat head carried by the edge of the opposite sheet and extending continuously throughout the length of said edge, and a slide cooperating with the retaining means and head and having means thereon to bend the head along a line extending longitudinally thereof and force it into engagement with the retaining means.

4. A separable fastener for connecting the edges of adjacent sheets of material comprising retaining means on one of said sheets, said retaining means comprising an abutment adjacent the edge of said sheet and extending throughout the length of said edge, a second continuous abutment carried by said sheet in spaced relation to the first abutment to define an area between the same for accommodating an interengaging member, a distortable, resilient flat head carried by the edge of the opposite sheet and extending continuously throughout the length of said edge, the head being of greater width than the width of the space between the abutments, and slide means cooperating with the retaining means and head for effecting interengagement thereof, said slide having means thereon for bending the head along a line extending longitudinally thereof so that the edges thereof may engage the retaining means when the slide releases the same.

5. A separable fastener for connecting the edges of adjacent sheets of material comprising retaining means, said retaining means including spaced channels lying on one face of the sheets and extending continuously along the edge thereof, a head extending continuously along the edge of the opposite sheet, and a slide cooperating with both sheets and having means thereon for bending the head along a line extending longitudinally thereof and inserting the edges thereof into said channels.

6. A separable fastener for connecting the edges of adjacent sheets of material comprising retaining means including spaced channels lying on one face of one of the sheets and extending continuously along the edge thereof, a head of greater width than the width of the space between the channels extending continuously along the edge of the opposite sheet, and a slide cooperating with both sheets and having means thereon for bending the head along a line extending longitudinally thereof and inserting the edges thereof into the channel.

7. A separable fastener for connecting the edges of adjacent sheets of material comprising retaining means, said retaining means including spaced rows of openings extending along the edge of one of the sheets, a head of greater width than the width of the space between the rows of openings extending continuously along the edge of the opposite sheet and having teeth on its opposite edges, and a slide cooperating with both sheets and having means thereon for distorting the head and inserting the teeth on the head into the openings on the opposed sheet.

8. A separable fastener for connecting the edges of adjacent sheets of material comprising retaining means including spaced abutments extending throughout the length of one edge, said retaining means including a row of spaced openings, a head extending continuously along the edge of the opposite sheet and having edges for engagement with said spaced abutments, one edge of said head having teeth thereon for engagement with the row of openings, and a slide cooperating with both sheets and having means thereon for distorting the head to effect engagement between the same and the spaced abutments.

9. A separable fastener for connecting the edges of adjacent sheets of material comprising retaining means including spaced abutments extending throughout the length of one edge, said retaining means including a row of spaced openings, a head of greater width than the width of the space between the abutments extending continuously along the edge of the opposite sheet and having edges for engagement with said spaced abutments, one edge of said head having teeth thereon for engagement with the row of openings, and a slide cooperating with both sheets and having means thereon for distorting the head to effect engagement between the same and the spaced abutments.

10. A separable fastener for connecting the edges of sheets comprising a continuous channel carried by one of said sheets spaced from the edge thereof, and a continuous, compressible, resilient strip carried by said sheet at the edge thereof, a head comprising a continuous flat strip carried by the other sheet at the edge thereof, and a slide having converging flanges engaging the strips and forcing one edge of the head into the channel on the opposed sheet and the other edge of the head into engagement with the strip of the opposed sheet by bending the head along a line extending longitudinally thereof.

11. A separable fastener for connecting the edges of sheets comprising a continuous channel carried by one of said sheets spaced from the edge thereof, and a continuous, compressible, resilient strip carried by said sheet at the edge thereof, a head comprising a continuous flat strip of greater width than the width of the space between the channel and strip carried by the other sheet at the edge thereof, and a slide having converging flanges engaging the strips and forcing one edge of the head into the channel on the opposed sheet and the other edge of the head into engagement with the strip of the opposed sheet by bending the head along a line extending longitudinally thereof.

12. A separable fastener for connecting the edges of sheets comprising a row of spaced openings carried by one of the sheets spaced from the edge thereof and a continuous, compressible, resilient strip carried by said sheet at the edge thereof, a head comprising a continuous strip provided with teeth carried by the other sheet at the edge thereof, and a slide cooperating with the strips and having means thereon for forcing the teeth on the edge of the head into the row of openings on the opposed sheet and the other edge of the head into engagement with the strip of the opposed sheet.

13. A separable fastener for connecting the edges of adjacent sheets of material comprising a substantially continuous socket adjacent the edge of one sheet of material extending throughout the length thereof, a second substantially continuous socket carried by the same sheet and spaced laterally from the first socket, the second socket likewise extending substantially continuously throughout the length of the sheet to be joined, and a flat, continuous, resilient flexible head carried by the edge of the other sheet and extending throughout the length of the sheet carrying the same, a strip secured to the head at a point intermediate the edges of the head for attaching the head to its sheet, and a slide cooperating with the retaining means and head and having means thereon to flex the head and force the edge thereof into engagement with the sockets.

14. A separable fastener for connecting the edges of adjacent sheets of material comprising retaining means including spaced rows of openings extending along the edge of one of the sheets, a head extending continuously along the edge of the opposite sheet and having teeth on its opposite edges, and a slide cooperating with both sheets and having means thereon for inserting the teeth on the head into the openings.

15. A separable fastener for connecting the edges of adjacent sheets of material comprising a substantially continuous channel adjacent the edge of one sheet, a second substantially continuous channel carried on the same surface of said sheet and spaced laterally from the first channel, a continuous flat head carried by the edge of the other sheet, and a slide cooperating with said channels and head having means thereon for progressively forcing first one edge of the head into one channel and then forcing the other edge of said head into the other channel.

ALEXANDER M. BROWN.